US009666081B2

(12) United States Patent
Gomez et al.

(10) Patent No.: US 9,666,081 B2
(45) Date of Patent: May 30, 2017

(54) METHOD AND ELECTRONIC DEVICE FOR MANAGING, IN THE FORM OF SEQUENCES, MESSAGES EXCHANGED BETWEEN AN AIRCRAFT AND A GROUND STATION, RELATED COMPUTER PROGRAM PRODUCT

(71) Applicant: THALES, Courbevoie (FR)

(72) Inventors: Stephane Gomez, Toulouse (FR); Romain Ory, Toulouse (FR); Sebastien Rey, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/086,641

(22) Filed: Mar. 31, 2016

(65) Prior Publication Data

US 2016/0293014 A1    Oct. 6, 2016

(30) Foreign Application Priority Data

Mar. 31, 2015    (FR) ..................... 15 00649

(51) Int. Cl.
*G08G 1/00*    (2006.01)
*G08G 5/00*    (2006.01)
(Continued)

(52) U.S. Cl.
CPC ....... *G08G 5/0013* (2013.01); *H04B 7/18506* (2013.01); *H04L 51/16* (2013.01); *H04L 67/12* (2013.01)

(58) Field of Classification Search
CPC .. G08G 5/0013; H04B 7/18506; H04L 51/16; H04L 67/12
See application file for complete search history.

(56) References Cited

U.S. PATENT DOCUMENTS 5,602,916 A *  2/1997  Grube ..................... H04L 12/22
                                                   380/270
2002/0032853 A1*  3/2002  Preston ................. H04L 63/061
                                                   713/151
(Continued)

FOREIGN PATENT DOCUMENTS

EP          2447929 A1    5/2012

OTHER PUBLICATIONS

International Search Report for FR 1500649 dated Feb. 12, 2016.

*Primary Examiner* — Hai Phan
*Assistant Examiner* — Royit Yu
(74) *Attorney, Agent, or Firm* — Thompson Coburn LLP

(57) ABSTRACT

This method for managing messages exchanged between a ground station and an aircraft is implemented by an electronic device. Each message includes an identifier, a dialogue number and data. This method comprises acquiring a message, determining the identifier of the acquired message, and comparing the determined identifier with identifiers contained in a table of current sequences. When the identifier corresponds to a sequence of said table, the method comprises associating the acquired message with said sequence, and otherwise, it comprises generating a new sequence using a list of sequences, associating the acquired message with the new generated sequence, and updating the table of current sequences with the new generated sequence. Each sequence includes one or several dialogues, each dialogue including at least two messages.

10 Claims, 5 Drawing Sheets

(51) Int. Cl.
*H04L 29/08* (2006.01)
*H04B 7/185* (2006.01)
*H04L 12/58* (2006.01)

(56) References Cited

U.S. PATENT DOCUMENTS

| | | | |
|---|---|---|---|
| 2003/0068044 A1* | 4/2003 | Nikolsky | B64D 45/0015 380/258 |
| 2003/0119484 A1* | 6/2003 | Adachi | H04L 63/04 455/411 |
| 2007/0225882 A1* | 9/2007 | Yamaguchi | B60W 50/14 701/36 |
| 2009/0052370 A1* | 2/2009 | Leclercq | H04B 7/18508 370/316 |
| 2009/0187343 A1* | 7/2009 | Koch-Groeber | B60K 35/00 701/301 |
| 2011/0291861 A1* | 12/2011 | Meunier | G08G 5/0008 340/945 |
| 2016/0127262 A1* | 5/2016 | Lawrence, III | H04L 47/32 709/219 |

* cited by examiner

METHOD AND ELECTRONIC DEVICE FOR MANAGING, IN THE FORM OF SEQUENCES, MESSAGES EXCHANGED BETWEEN AN AIRCRAFT AND A GROUND STATION, RELATED COMPUTER PROGRAM PRODUCT

CROSS-REFERENCE TO RELATED APPLICATIONS

This application claims the benefit of French application FR 15 00649, filed Mar. 31, 2015, which is incorporated herein by reference in its entirety.

FIELD OF THE INVENTION

The present invention relates to a method for managing messages exchanged between a ground station and an aircraft piloted by at least one pilot.

The present invention also relates to a non-transitory computer-readable medium including a computer program product including software instructions which, when they are executed by a computer, implement such a management method.

The present invention also relates to an electronic device for managing exchanged messages.

By <<ground station>> is meant an air traffic control center above a predetermined geographic area or any other station intended to control or at least to observe the aircraft in such an area.

By <<aircraft>> is meant a mobile machine piloted by at least one pilot, and able to fly notably in the earth's atmosphere, such as an airplane, a drone or a helicopter.

By <<pilot>> is meant a person piloting the aircraft from a piloting station located in the aircraft or at a distance from the latter.

BACKGROUND OF THE INVENTION

Generally, such an aircraft is able to fly in the earth's atmosphere under the control of at least one ground station. This control is carried out depending on the air traffic in the surroundings of the aircraft and notably allows optimization of this traffic and avoidance of collisions.

Various communication routes giving the possibility of ensuring the communication between the pilot of the aircraft and the ground station exist in the state of the art.

Among these routes, the voice communication between the pilot and the ground station via radiocommunication devices play a significant role. However, this communication route is not always accessible all along the flight of the aircraft and may sometimes lead to an erroneous interpretation of the information transmitted orally by either one of the parties.

Thus, in addition to voice communication, the use of a text communication route is known allowing exchange of text messages between the pilot of the aircraft and the ground station. This communication route is known in the state of the art under the term of <<Data Link>>, and corresponds to the layer 2 of the ISO model according to the ISO 7498.

Generally, each exchange message via the communication route of the <<Data Link>> type comprises a field of data, containing data, generally so-called operational data, corresponding to a request or to a response to a request.

Each exchange message further comprises descriptive data notably defining an identifier of the message and the type of said message. Thus for example, it is standard to distinguish messages of the ATC (Air Traffic Control) type corresponding to messages relating to air control, and messages of the AOC (Aeronautical Operational Control) type corresponding to messages relating to the use of the aircraft.

Each dialogue comprises messages of the same type, i.e. one or several requests and one or several replies to this or to these requests exchanged between the ground station and the pilot of the aircraft.

A succession of dialogues forms a sequence of dialogues when the dialogues of this sequence are related by a common operational subject. By <<operational subject>> is meant a set of pieces of information relating to the condition of the aircraft during a determined period of use and to actions of the pilot exerted on the aircraft in this condition and intended to attain a same objective. Thus, the pieces of information relating to different flight phases of the aircraft, such as for example the take-off phase or the landing phase, are considered as operational subjects.

In order to implement the communication route of the <<Data Link>>, type, the aircraft generally includes a module for acquiring messages of the <<Data Link>>, type, a module for displaying each text message gradually as it is acquired, and a module for storing acquired messages.

The storage module (also known under the term of Logbook Data Link) allows a pilot to consult text messages acquired previously when the operational data contained in these messages are required.

However, the pilot does not have the possibility of having an overview of the whole of the acquired text messages and stored in the storage means in order to easily find one or several required messages. The searching for these particular messages from among the whole of the messages therefore implies a significant cognitive burden for the pilot of the aircraft, and then decreases the safety of the flight.

SUMMARY OF THE INVENTION

The goal of the present invention is to propose a method for managing messages exchanged between a ground station and an aircraft allowing the pilot to find more rapidly and more easily one or several relevant messages, for example in connection with the last acquired message, of reducing the required cognitive burden of the pilot, and of then improving the safety of the flight.

For this purpose, the subject-matter of the invention is a method for managing exchange messages between a ground station and an aircraft piloted by at least one pilot, each message including an identifier, a dialogue number and data, the method being implemented by an electronic device for managing exchange messages, and comprising:
  acquiring a message;
  determining the identifier of the acquired message;
  comparing the identifier of the acquired message with identifiers of messages contained in a table of current sequences, and
  when the identifier of the acquired message corresponds to a sequence from among the sequences contained in the table of current sequences:
    associating the acquired message with said sequence, and
  when the identifier of the acquired message does not correspond to any of the sequences contained in the table of current sequences:
    generating a new sequence using a list of sequences,
    associating the acquired message with the new generated sequence, and updating the table of current sequences with the new generated sequence;

each sequence including one or several dialogues, each dialogue including at least two messages, said messages corresponding to a request and to a response to this request, respectively.

According to other advantageous aspects of the invention, the management method comprises one or several of the following features, taken individually or according to all the technically possible combinations:

- the method further comprises displaying at least one current sequence, each displayed sequence including the acquired message(s) associated with said sequence;
- the list of sequences includes an entry point for each sequence, the entry point being the identifier of the first message of the sequence, and a new sequence is only generated if the identifier of the acquired message corresponds to the entry point of a sequence from the list of sequences;
- the table of current sequences contains, for each sequence, at least one expected identifier, each expected identifier being the identifier of a next authorized message of the sequence, and the list of sequences includes, for each sequence, one or several possible sequences of authorized messages;
- a new sequence is generated when no expected identifier is equal to the identifier of the acquired message, at least one expected identifier is then determined for the new sequence from the list of sequences, and the table of current sequences is updated by adding said new sequence with the determined expected identifier(s);
- when a single expected identifier is equal to the identifier of the acquired message, the acquired message is associated with the sequence corresponding to this expected identifier, at least one new expected identifier is determined for said sequence from the list of sequences, and the table of current sequences is updated by replacing, for said sequence, the old expected identifier(s) with the new determined expected identifier(s);
- the method further comprises, when several expected identifiers are equal to the identifier of the acquired message, determining the dialogue number of the acquired message, and the acquired message is associated with the sequence corresponding to the dialogue number of the acquired message, from among the sequences for which the expected identifiers are equal to the identifier of the acquired message;
- the determined dialogue number is an MRN number according to the RTCA DO258A standard;
- each message is a data link message according to layer 2 of the ISO model according to the ISO 7498 standard, such as an ATC message in connection with air control or an AOC message in connection with the use of the aircraft.

The subject-matter of the invention is also a non-transitory computer-readable medium including a computer program product including software instructions which, when they are executed by a computer, implement a method as defined above.

The subject-matter of the invention is also an electronic device for managing exchange messages between a ground station and an aircraft piloted by at least one pilot, each message including an identifier, a dialogue number and data, the device comprising:

an acquisition module configured for acquiring a message;

a determination module configured for determining the identifier of the acquired message; and a processing module configured for comparing the identifier of the acquired message with identifiers of messages contained in a table of current sequences, and for:

when the identifier of the acquired message corresponds to a sequence from among the sequences contained in the table of current sequences:
associating the acquired message with said sequence, and when the identifier of the acquired message does not correspond to any of the sequences contained in the table of current sequences:
generating a new sequence using a list of sequences,
associating the acquired message with the new generated sequence, and
updating the table of current sequences with the new generated sequence;

each sequence including one or several dialogues, each dialogue including at least two messages, said messages corresponding to a request and to a response to this request respectively.

BRIEF DESCRIPTION OF THE DRAWINGS

These features and advantages of the invention will become apparent upon reading the description which follows, only given as a non-limiting example, and made with reference to the appended drawings, wherein.

DETAILED DESCRIPTION OF PREFERRED EMBODIMENTS

Figure 1:
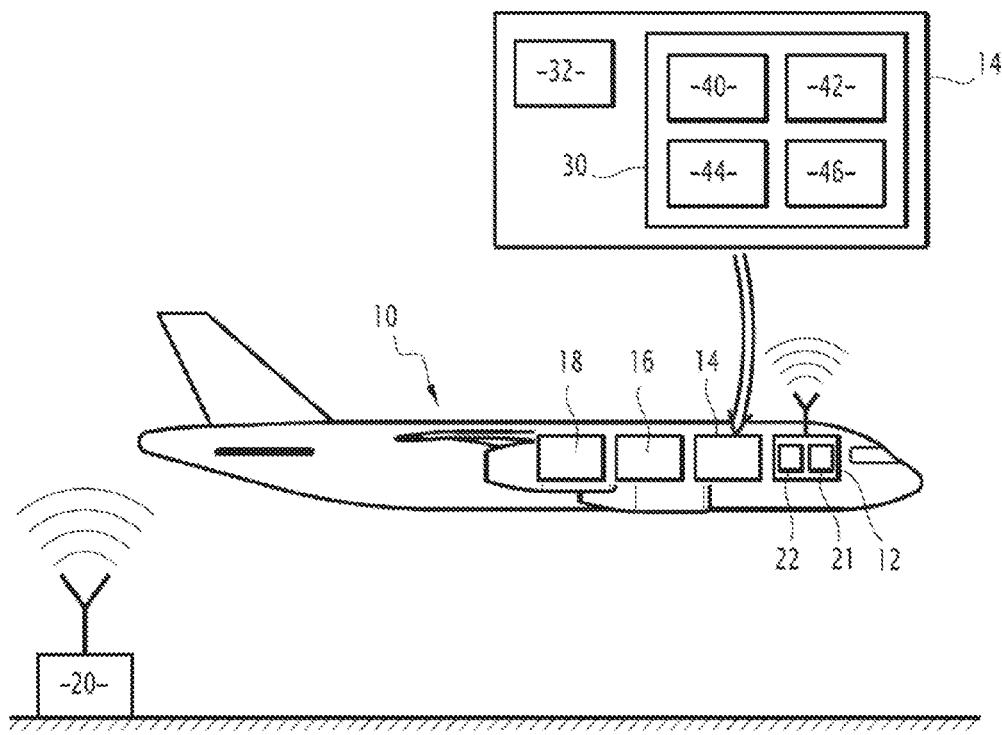
FIG. 1 is a schematic view of an aircraft including an electronic device according to the invention for managing exchanged messages and means forming a man-machine interface.

In the example of FIG. 1, the aircraft 10 is an airliner able to be piloted by at least one pilot. The piloting of the aircraft 10 includes various flight phases, such as for example take-off, ascent, descent or further landing phases.

According to other examples, the aircraft 10 is an airplane of another type, such as for example a business airplane or a military airplane, or further a helicopter.

According to further another example, the aircraft 10 is a drone remotely piloted by a pilot using a station for remote piloting of the aircraft.

The aircraft 10 includes a module 12 for communication with the ground station 20 notably allowing exchange with the ground station 20 of text messages of the <<Data Link>> type, corresponding to layer 2 of the ISO model according to the ISO 7498, an electronic device 14 for managing said messages, means forming a man-machine interface 16, also called man-machine interface means, and a module 18 for storage of said messages.

The communication module 12 is configured for communicating with at least one ground station 20, such as an air traffic control center above a geographic area overflown by the aircraft 10. Alternatively, the ground station 20 is a center for observation of the aircraft 10 by the corresponding airline company.

The communication module 12 includes a first communication unit 21 for voice communication with the ground station 20 and a second communication unit 22 for communication via text messages of the <<Data Link>> type.

The electronic device 14 for managing messages is connected to the second communication unit 22. The electronic management device 14 is configured for processing both text messages of the <<Data Link>> type received by the second communication unit 22, and text messages of the <<Data Link>> type intended to be transmitted to the ground station 20 via the second communication unit 22.

In the following of the description, by <<acquired message>> is meant a message acquired by the management device 14 with view to its processing, each acquired message then being a message received by the aircraft 10, via the second communication unit 22, from the ground station 20, or else a message transmitted by the aircraft 10, via the second communication unit 22, intended for the ground station 20. For the messages of the <<Data Link>> type, a message received by the aircraft 10 is also called an uplink message, from the ground station 20 to the aircraft 10, and an identifier of the received message then begins by UM (Uplink Message). By analogy, a message of the <<Data Link>> type, transmitted by the aircraft 10, is also called a down link message, from the aircraft 10 to the ground station 20, and an identifier of the received message then begins with DM (Downlink Message).

The acquired messages of the <<Data Link>> type are for example ATC or AOC messages, or more specifically CPDLC messages (Control Pilot Data Link Communication) for the ATC.

The electronic management device 14 is configured for implementing a method for managing exchange messages between the aircraft 10 and the ground station 20 according to the invention, a method which will be described in more detail subsequently.

The electronic device 14 is for example an onboard computer including for example a memory 30 and a processor 32 associated with the memory 30. The memory 30 is able to store a software 40 for acquiring a message, and in particular a text message of the <<Data Link>> type and a software 42 for determining the identifier of the acquired message. The memory 30 is also able to store a suitable processing software 44 for comparing the identifier of the acquired message with message identifiers contained in a current table of sequences and for, depending on the result of this comparison, carrying out subsequent processing operations which will be described in more detail subsequently with reference to FIG. 2, these processing operations having the purpose of associating the acquired message with a current sequence or generating a new sequence when no current sequence corresponds to the acquired message. The memory 30 is also able to store a software 46 for displaying at least one current sequence, each displayed sequence including the acquired message(s) associated with said sequence. The processor 32 is configured for executing each of the pieces of software 40, 42, 44, 46.

Each sequence Si includes one or several dialogues Di, each dialogue Di including at least two messages, said messages corresponding to a request and to a response to this request respectively, as this will be described in more detail subsequently, notably with reference to FIGS. 3 and 4. More specifically, each sequence Si comprises a succession of dialogues Di relating to a same operational subject.

When they are executed by the processor 32, the acquisition software 40, the determination software 42 and the processing software 44 and the display software 46 respectively form an acquisition module configured for acquiring a message, a determination module configured for determining the identifier of the acquired message; a processing module configured for comparing the identifier of the acquired message with message identifiers contained in the current table of sequences and for carrying out subsequent processing operations depending on the result of this comparison, and a display module configured for displaying at least one current sequence.

Alternatively, the acquisition module 40, the determination module 42, the processing module 44 and the display module 46 are produced as programmable logic components, such as one or several FPGAs (Field-Programmable Gate Arrays), or further in the form of dedicated integrated circuits, of the ASIC (Application-Specific Integrated Circuit) type.

The man-machine interface means 16 are connected to the electronic device 14. The man-machine interface means 16 include a display screen, a unit of inputting information and a pointing device, such as a mouse, not shown. The display screen is dedicated to the display pieces of information relating to the communication with the ground station 20. According to an example, the display screen is a touch screen. The unit for inputting information allows the pilot to input a text message of the <<Data Link>> type for transmitting it to the ground station 20 through the electronic device 14 and the second communication unit 22. The unit for inputting information for example comprises a keyboard.

The storage module 18 is connected to the electronic device 14, and for example comprises a hard disc able to store transmitted or received text messages via the electronic device 14.

The storage module 18 thus forms a <<Logbook Data Link>> of the messages exchanged between the aircraft 10 and the ground station 20.

In the example of FIG. 1, the means 16 forming a man-machine interface and the storage module 18 are distinct from the electronic management device 14. In an alternative not shown, the means 16 forming the man-machine interface, the storage module 18 and the electronic management device 14 are integrated within a same electronic equipment.

The first communication unit 21, known per se, gives the possibility to the pilot of communicating by voice, i.e. orally, with the ground station 20. More particularly, the first communication unit 21 comprises a voice radiocommunication device via radioelectric waves for example high frequencies of the HF type (High Frequency) or of very high frequencies of the VHF (Very High Frequency) type.

For this purpose, the communication unit 21 defines a coverage domain in which it is able to transmit and receive radioelectric waves of said frequencies. Thus, the voice communication between the pilot and the ground station 20 is possible when the ground station 20 is in the coverage domain of the first communication unit 21.

The second communication unit 22 allows the pilot to communicate with the ground station 20 by exchanging text messages of the <<Data Link>> type. The text messages are transmitted as radioelectric waves by using various transmission technologies, known per se.

For example, when the distance between the aircraft 10 and the ground station 20 is less than a few hundred kilometers, for example less than 400 km, preferably less than 370 km, the transmission of said radioelectric waves is directly carried out by using very high frequencies of the VHF type.

When the distance between the aircraft 10 and the ground station 20 does not allow direct transmission, the transmission of said radioelectric waves is carried out through over ground stations and/or satellites.

Generally, the communication via text messages of the "Data Link" type is mentioned in various standards from the aeronautical field, such as for example the EUROCAE-ED-100A, EUROCAE-ED-110B and EUROCAE-ED-228 standards.

Each text message of the <<Data Link>> type relates to the piloting of the aircraft 10 and for example allows the aircraft to be piloted in agreement with the ground station 20.

Each text message of the <<Data Link>> type includes descriptive data and operational data.

The descriptive data are metadata giving the possibility of characterizing the corresponding text message. Descriptive data notably comprise the following data fields, also called data categories:
- a type of the message;
- an identifier of the message;
- a dialogue number, also called MRN (Message Reference Number);
- the date of transmission or reception of this message by the aircraft 10;
- identifiers of starting and/or arrival points of the aircraft 10;
- an identifier of the ground station 20; and
- when the message is transmitted by the station 20, the date of its transmission and the estimated geographic position of the aircraft 10 by the ground station 20.

The type of the message allows distinction of the messages according to their application to the piloting of the aircraft 10. Each type of message is selected from an ATC type corresponding to the messages in connection with air control and an AOC type corresponding to messages in connection with the use of the aircraft 10, notably of various components of the aircraft 10.

In the examples described subsequently, each ATC message has an identifier beginning by UM for the uplink messages received by the aircraft 10 from the ground station 20, or with DM for the downlink messages transmitted by the aircraft 10 to the ground station 20, and then followed by one or several figures, or even optionally one or several letters following the figure(s).

In the case of AOC messages, the format of the identifier of the AOC message depends on each AOC provider, while allowing unique identification of each message.

Operational data are application data which may be directly used for piloting the aircraft 10. Operational data correspond generally to a request or to a response to a request exchanged between the pilot of the aircraft 10 and the ground station 20.

As an example, such a request comprises a request for changing the cruising altitude of the aircraft 10 addressed by the pilot to the air control center. A response to such a request then comprises an authorization or a prohibition of this change, from the air control center.

In other words, each text message of the <<Data Link>> type notably comprises an identifier of the message, a dialogue number and a field of data corresponding to a request or to a response to a request.

Each dialogue Di comprises messages including a same dialogue number, such as a same MRN, and corresponding to a request and to at least one response to this request. The MRN number is defined by the RTCA DO258A standard.

Thus, in the previous example, the dialogue Di is formed by a message corresponding to the request of the pilot for changing the altitude, and a message corresponding to the response of the air control center to this request. It should be noted that in this case, both messages have a same MRN and are of the ATC type.

In the example mentioned above, the sequence Si is formed with several dialogues Di, for example relating to the cruising altitude, or more generally the cruising phase.

In order to determine the belonging of a message or of a dialogue Di to a sequence Si, the storage module 18 is able to store a list of sequences, this list including, for each sequence, one or several possible sequences of authorized messages. The list of sequences further includes preferably an entry point for each sequence, the entry point being the identifier of the first message of the sequence.

The list of sequences is for example predefined and stored in the storage module 18.

Alternatively, the list of sequences is calculated using the theory of languages. Each sequence is then considered as a Language. Each sequence or Language is defined by an operational theme, also called an operational subject.

The list of sequences then includes, for each sequence, for each of the considered operational themes, one or several possible sequences of authorized messages.

As a purely indicative example, two examples of operational themes will be illustrated subsequently, a first exemplary theme being the theme associated with the sending of a departure clearance, also called DCL theme (Departure Clearance), for allowing the pilot to determine the path to take in the CTR (Control Traffic Region)/CTA (Control Traffic Area) area for joining up with the route of its flight outside the CTA/TMA (Terminal Maneuvering Area) area. A second exemplary theme is the theme associated with the sending of a D-Taxi clearance, also called a D-Taxi theme, for allowing the pilot to determine the path to be taken in the airport area before taking off or after landing, in order to leave or attain the provided location for parking the aircraft. According to these examples, a sequence or Language then defines the sequence of ATC messages of the DCL theme and another sequence or Language defines the sequence of ATC messages of the D-Taxi.

According to the theory of languages, the Languages are defined by a Grammar handling terminal elements or not. Terminal elements are the lower level elements. They correspond to the message exchanges between the ground station 20 and onboard. The non-terminal elements give the possibility of describing the Grammar by passing through intermediate rules.

The global Language of the ATC messages is the sum of all the Languages each related to an operational theme (DCL, D-Taxi, . . . ). The grammar of the global Language then verifies the following equation:

$$G_L = \sum_{t \in S_{DLK}} G_t \qquad (1)$$

wherein $S_{DLK}$ represents the whole of the exchanges of the <<Data Link>> type, i.e. the whole of the ATC and AOC exchanges, wherein $S_{DLK}$ then verifies:

$$S_{DLK} = S_{ATC} \cup S_{AOC} \qquad (2)$$

with $S_{ATC}$ representing the whole of the ATC exchanges and $S_{AOC}$ representing the whole of the AOC exchanges.

In the example of the first theme, three dialogues D1, D2, D3 describe exchanges of the DCL type. They are defined by the following Table 1, with the symbol "&" representing a logic "AND", and the symbol "+" representing a logic "OR".

TABLE 1

| List of dialogues | List of possible dialogues | Modeling the dialogues |
|---|---|---|
| D1 | D1 = DM139 &UM1<br>Or D1 = DM139 & UM0 | DM139 & (UM1 + UM0) |
| D2 | D2 = (UM73R &UM267) & (DM2 &DM0)<br>or D2 = (UM73R &UM267) & (DM2 &DM1)<br>or D2 = (UM73R &UM267) & DM0<br>Or D2 = (UM73R &UM267) & DM1 | (UM73R & UM267) & ((DM2 & DM0) + (DM2 & DM1) + DM0 + DM1) |
| D3 | D3 = (UM325 & UM267) & ((DM2 & DM0)<br>or D3 = (UM325 & UM267) &(DM2 & DM1)<br>or D3 = (UM325 & UM267) &DM0<br>Or D3 = (UM325 & UM267) &DM1 | (UM325 & UM267) & ((DM2 & DM0) + (DM2 & DM1) + DM0 + DM1) |

In this example, the grammar of the DCL theme, noted as $G_{DCL}$, verifies the following equation:

$$G_{DCL} = D1^{\{0,1\}} \& D2 \& D3^{\{0,n\}} \quad (3)$$

This grammar $G_{DCL}$ is read in the following way. The dialogue D1 may begin the sequence. This is the sending of the DCL request to the ground station 20 (B_DCL). This dialogue D1 is optional, since the ground station 20 may transmit the clearance DCL (S_DCL) without any request from onboard the aircraft. The number of occurrences of the dialogue, for which the limits are indicated between square brackets, like for example in equation (3), is then comprised between 0 and 1.

Next, the dialogue D2 follows the dialogue D1, when it is present or else forms the beginning of the sequence. The presence of the dialogue D2 is mandatory, and the number of occurrences of said dialogue D2 is then equal to 1. It should be noted that when the occurrence number is equal to 1, the latter is not explicitly specified between square brackets in the equation of the grammar. The dialogue D2 relates to the response from onboard the aircraft to the DCL clearance transmitted by the ground station 20 (B_WILCO).

Finally, the dialogue D3 follows the dialogue D2, the dialogue D3 being optional. The dialogue D3 may not be present (value 0) as this may be the case for up to n times, n being an integer greater than or equal to 1, of any value. The dialogue D3 relates to the revision of the DCL clearance (S_REV). It may be transmitted as many times as estimated necessary by the ground station 20. The exponent {0,n} then indicates a number of occurrences of the element comprised between 0 and n.

The DCL Language (or Sequence) contains the three rules (or Dialogues) such that:

D1=B_DCL & S_STBY$^{\{0,1\}}$ & S_UNABLE$^{\{0,1\}}$

D2=S_DCL & B_STBY$^{\{0,1\}}$ & (B_UNABLE|B_WILCO)

D3=S_REV & B_STBY$^{\{0,1\}}$ & (B_UNABLE|B_WILCO)

And then the other rules are:

S_DCL=UM73R&UM267, the symbol <<&>> representing here the concatenation of both of these messages respectively having UM73R and UM267 as an identifier.

S_STBY=UM1

S_UNABLE=UM0

S_REV=UM325&UM267, the symbol <<&>> representing here the concatenation of both of the two messages respectively having UM325 and UM267 as identifiers.

B_DCL=DM139

B_WILCO=DM0

B_UNABLE=DM1

B_STBY=DM2

The whole of these rules define the Grammar $G_{DCL}$ of the DCL theme, the grammar describing the Language $L_{DCL}$ of this DCL theme.

In order to determine whether the B_STBY intervenes in the dialogues D1 or D2 or D3, the dialogue number MRN is recognized and taken into account as this will be described subsequently.

In the example of the first theme, the list of sequences for this first theme then includes the information listed in Table 2.

TABLE 2

| List of possible sequences for DCL | Entry point | List of dialogues | List of possible dialogues | MRN |
|---|---|---|---|---|
| SEQ_DCL1 | DM139 | D1 | D1 = DM139 &UM1<br>or D1 = DM139 & UM0 | Value of the MIN of the message DM139 |
| | | D2 | D2 = (UM73R &UM267) & (DM2 &DM0)<br>or D2 = (UM73R &UM267) & (DM2 &DM1)<br>or D2 = (UM73R &UM267) & DM0<br>or D2 = (UM73R &UM267) & DM1 | Value of the MIN of the concatenation of the messages UM73R and UM267 |
| | | D3 | D3 = (UM325 & UM267) & ((DM2 & DM0)<br>or D3 = (UM325 & UM267) &(DM2 & DM1)<br>or D3 = (UM325 & | Value of the MIN of the concatenation of the messages UM325 and UM267 |

TABLE 2-continued

| List of possible sequences for DCL | Entry point | List of dialogues | List of possible dialogues | MRN |
|---|---|---|---|---|
| SEQ_DCL2 | (UM73R&UM267) | D2 | UM267) &DM0<br>or D3 = (UM325 & UM267) &DM1<br>D2 = (UM73R &UM267) & (DM2 &DM0)<br>or D2 = (UM73R &UM267) & (DM2 &DM1)<br>or D2 = UM73R &UM267) & DM0<br>or D2 = UM73R &UM267) & DM1 | Value of the MIN of the concatenation of the messages UM73R and UM267 |
| | | D3 | D3 = (UM325 & UM267) & ((DM2 & DM0)<br>or D3 = (UM325 & UM267) &(DM2 & DM1)<br>or D3 = (UM325 & UM267) &DM0<br>or D3 = (UM325 & UM267) &DM1 | Value of the MIN of the concatenation of the messages UM325 and UM267 |

Figure 3:
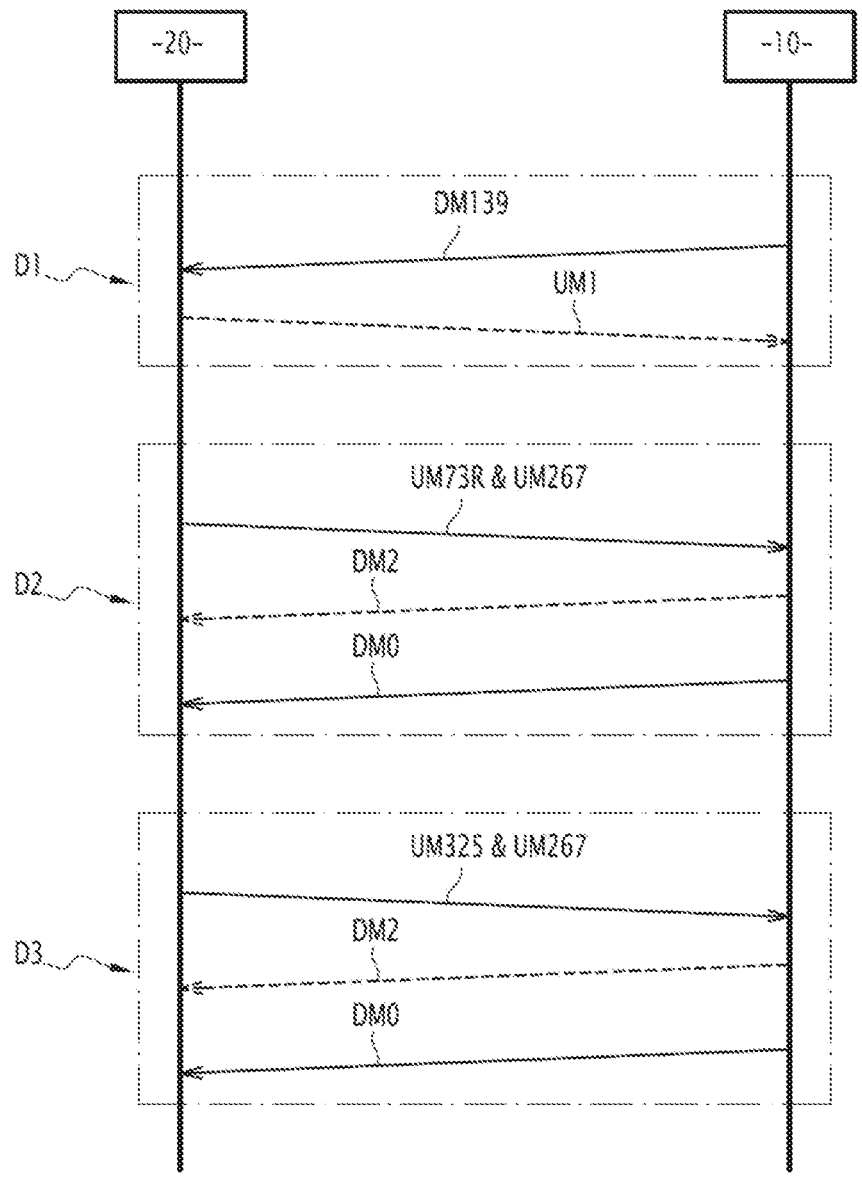
FIGS. 3 and 4 are schematic views each illustrating an exemplary sequence.

The sequence visible in FIG. 3 is the sequence SEQ_DCL1, having as an entry point the message DM139. In the example of FIG. 3, the dialogue D1 is the succession of the messages DM139 and UM1; the dialogue D2 is the succession of the concatenation of the messages UM73R and UM267, and then of the messages DM2 and DM0; and the dialogue D3 is the succession of the concatenation of the messages UM325 and UM267, and then of the messages DM2 and DM0.

One skilled in the art will observe that if the concatenation of the messages UM73R and UM267 is also the response to the message DM139 of the dialogue D1, the value of the MRN then remains equal to the MIN of the message DM139 for the dialogue D1. On the other hand, upon initialization of the dialogue D2, two values of the MRN will coexist with the second value of the MRN assuming the value of the MIN of the concatenation of the messages UM73R and UM267. This is a specific case of allocation of values for the MRN, both of the values of MRN then coexisting until the end of the dialogue D2 within the scope of the invention. The number MIN (Message Identification Number) is defined by the RTCA D0258A standard.

In the example of the second D-Taxi theme upon landing, three dialogues D4, D5, D6 describe the exchanges of the D-Taxi type. They are defined by Table 3.

TABLE 3

| List of dialogues | List of possible dialogues | Modelling the dialogues |
|---|---|---|
| D4 | D4 = UM315 &DM3<br>or D4 = UM315 & DM1<br>or D4 = UM315 & (DM2&DM1)<br>Or D4 = UM315 & (DM2&DM3) | UM315 & (DM1 + (DM2&DM1) + DM3 + (DM2&DM3)) |
| D5 | D5 = (UM325 &UM315) & DM3<br>or D5 = (UM325 &UM315) & DM1<br>or D5 = (UM325 &UM315) & (DM2&DM1)<br>or D5 = (UM325 &UM315) & (DM2&DM3) | (UM325 &UM315) & (DM1 + (DM2&DM1) + DM3 + (DM2&DM3)) |

TABLE 3-continued

| List of dialogues | List of possible dialogues | Modelling the dialogues |
|---|---|---|
| D6 | D6 = UM319 & DM0<br>or D6 = UM319 & DM1<br>or D6 = UM319 & (DM2&DM1)<br>Or D6 = UM319 & (DM2&DM0) | UM319 & (DM1 + (DM2&DM1) + DM0 + (DM2&DM0)) |

In this example, the grammar of the D-Taxi theme, noted as $G_{D\text{-}Taxi}$, verifies the following equation:

$$G_{D\text{-}Taxi} = D4^{\{0,1\}} \& D5^{\{0,m\}} \& D6 \qquad (4)$$

This grammar $G_{D\text{-}Taxi}$ is read in the following way. The dialogue D4 may begin the sequence. This is the sending of the D-Taxi information clearance (S_INF_DTAXI) by the ground station 20. Dialogue D4 is optional, and the ground station 20 may transmit the D-Taxi clearance (S_DTAXI) without having received beforehand the information clearance. D4 therefore has a number of occurrences comprised between 0 and 1.

Next, the dialogue D5 follows the dialogue D4, when it is present or else forms the beginning of the sequence. The dialogue D5 is the revision of the information clearance (S_INF_REV). The dialogue D5 may not be present (value 0), just like it may be present up to m times, m being an integer greater than or equal to 1, with any value. The information clearance may be transmitted as many times as estimated to be required by the ground station 20.

Finally, the dialogue D6 following the dialogue D4 and/or the dialogue D5, when at least one of the dialogues D4, D5 is present or else forms the beginning of the sequence. This dialogue D6 is mandatory, since it is the D-Taxi clearance (S_DTAXI) transmitted by the ground station 20. As the presence of the dialogue D6 is mandatory, the number of occurrences of said dialogue D6 is equal to 1.

The D-Taxi Language (or Sequence) contains the three rules (or Dialogues) such that:
D4=S_INF_DTAXI & B_STBY$^{\{0,1\}}$ & (B_UNABLE-|B_ROGER)
D5=S_INF_REV & B_STBY$^{\{0,1\}}$ & (B_UNABLE-|B_ROGER)

D6=S_DTAXI & B_STBY$^{\{0,1\}}$ & (B_UNABLE|B_WILCO)

And then the other rules are:

S_DTAXI=>UM319
S_STBY=>UM1
S_UNABLE=>UM0
S_INF_REV=>UM325&UM315, the symbol <<&>> representing here the concatenation of both of these messages having UM325 and UM315 respectively as identifiers.
S_INF_DTAXI=>UM315
B_ROGER=>DM3
B_WILCO=>DM0
B_UNABLE=>DM1
B_STBY=>DM2

The whole of these rules define the D-Taxi Grammar or $G_{DTAXI}$. The grammar describes the D-TAXI Language or $L_{DTAXI}$.

In order to determine whether B_STBY intervenes in the dialogues D4 or D5 or D6, the dialogue number MRN is recognized and taken into account as this will be described subsequently.

In the example of the second theme, the list of sequences for this second theme then includes the pieces of information listed in Table 4.

TABLE 4

| List of possible sequences for D-Taxi | Entry point | List of dialogues | List of possible dialogues | MRN |
|---|---|---|---|---|
| SEQ_D-Taxi1 | UM315 | D4 | D4 = UM315 &DM3 | Value of the |
| | | | or D4 = UM315 & DM1 | MIN of |
| | | | or D4 = UM315 & (DM2&DM1) | message |
| | | | or D4 = UM315 & (DM2&DM3) | UM315 |
| | | D5 | D5 = (UM325 &UM315) & DM3 | Value of the |
| | | | or D5 = (UM325 &UM315) & DM1 | MIN of the concatenation |
| | | | or D5 = (UM325 &UM315) & (DM2&DM1) | of messages UM315&UM325 |
| | | | or D5 = (UM325 &UM315) & (DM2&DM3) | |
| | | D6 | D6 = UM319 & DM0 | Value of the |
| | | | or D6 = UM319 & DM1 | MIN of the |
| | | | or D6 = UM319 & (DM2&DM1) | message UM319 |
| | | | or D6 = UM319 & (DM2&DM0) | |
| SEQ_D-Taxi2 | UM315 | D4 | D4 = UM315 &DM3 | Value of the |
| | | | or D4 = UM315 & DM1 | MIN of the |
| | | | or D4 = UM315 & (DM2&DM1) | message UM315 |
| | | | or D4 = UM315 & (DM2&DM3) | |
| | | D6 | D6 = UM319 & DM0 | Value of the |
| | | | or D6 = UM319 & DM1 | MIN of the |
| | | | or D6 = UM319 & (DM2&DM1) | message UM319 |
| | | | or D6 = UM319 & (DM2&DM0) | |
| SEQ_D-Taxi3 | UM319 | D6 | D6 = UM319 & DM0 | Value of the |
| | | | or D6 = UM319 & DM1 | MIN of the |
| | | | or D6 = UM319 & (DM2&DM1) | message UM319 |
| | | | or D6 = UM319 & (DM2&DM0) | |

Figure 4:
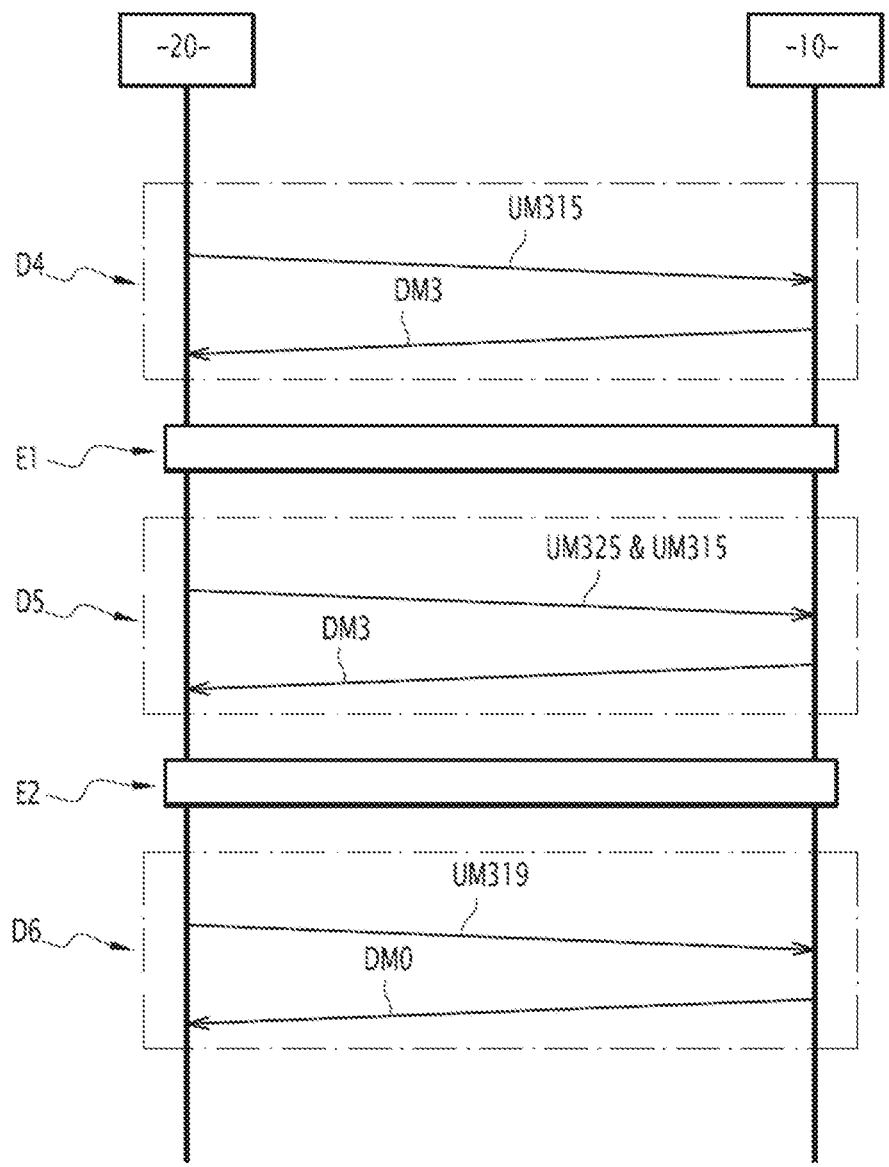

The visible sequence in FIG. 4 is the sequence SEQ_D-Taxi1, having as entry point the message UM315. In the example of FIG. 4, the dialogue D4 is the succession of the messages UM315 and DM3; the dialogue D5 is the succession of the concatenation of the messages UM325 and UM315, followed by the message DM3; and the dialogue D6 is the succession of the concatenation of the messages UM319 and DM0.In this example, the dialogue D5 follows a modification of a taxiway corresponding to an event E1, and the dialogue D6 follows the landing of the aircraft 10, corresponding to an event E2

The processing module 44 is configured for comparing the identifier of the acquired message (beginning with UM or DM), with message identifiers contained in the table of current sequences. When the identifier of the acquired message corresponds to a sequence from among the sequences contained in the table of current sequences, the processing module 44 is then configured for associating the acquired message with said sequence. When the identifier of the acquired message does not correspond to any of the sequences contained in the table of current sequences, the processing module 44 is then configured for generating a new sequence using the predefined list of sequences, in order to associate the acquired message with the new generated sequence, and for updating the table of current sequences, also called current list of sequences, with the new sequence have been generated.

Additionally, the processing module 44 is configured for generating a new sequence only if the identifier of the acquired message corresponds to the entry point of a sequence from the predefined list of sequences.

The table of current sequences contains, for each sequence, at least one expected identifier, each expected identifier being the identifier of a next authorized message of the sequence. Each expected identifier is for example determined from the list of sequences.

Additionally, the processing module 44 is configured for generating a new sequence when no expected identifier is equal to the identifier of the acquired message, so as to then determine at least one expected identifier for the new sequence, this from the list of sequences, and for updating the table of current sequences by adding said new sequence with the calculated expected identifier(s).

Still additionally, the processing module 44 is configured for, when a single expected identifier is equal to the identifier of the acquired message, associating the acquired message with the sequence corresponding to this expected identifier, so as to then define at least a new expected identifier for said sequence from the list of sequences, and for updating the table of current sequences by replacing, for said sequence, the old expected identifier(s) with the determined new expected identifier(s).

Still additionally, the processing module 44 is configured for, when several expected identifiers are equal to the identifier of the acquired message, determining the dialogue number MRN of the acquired message, and for associating the acquired message with the sequence corresponding to the dialogue number MRN of the acquired message, from among the sequences for which the expected identifiers are equal to the identifier of the acquired message.

Figure 2:
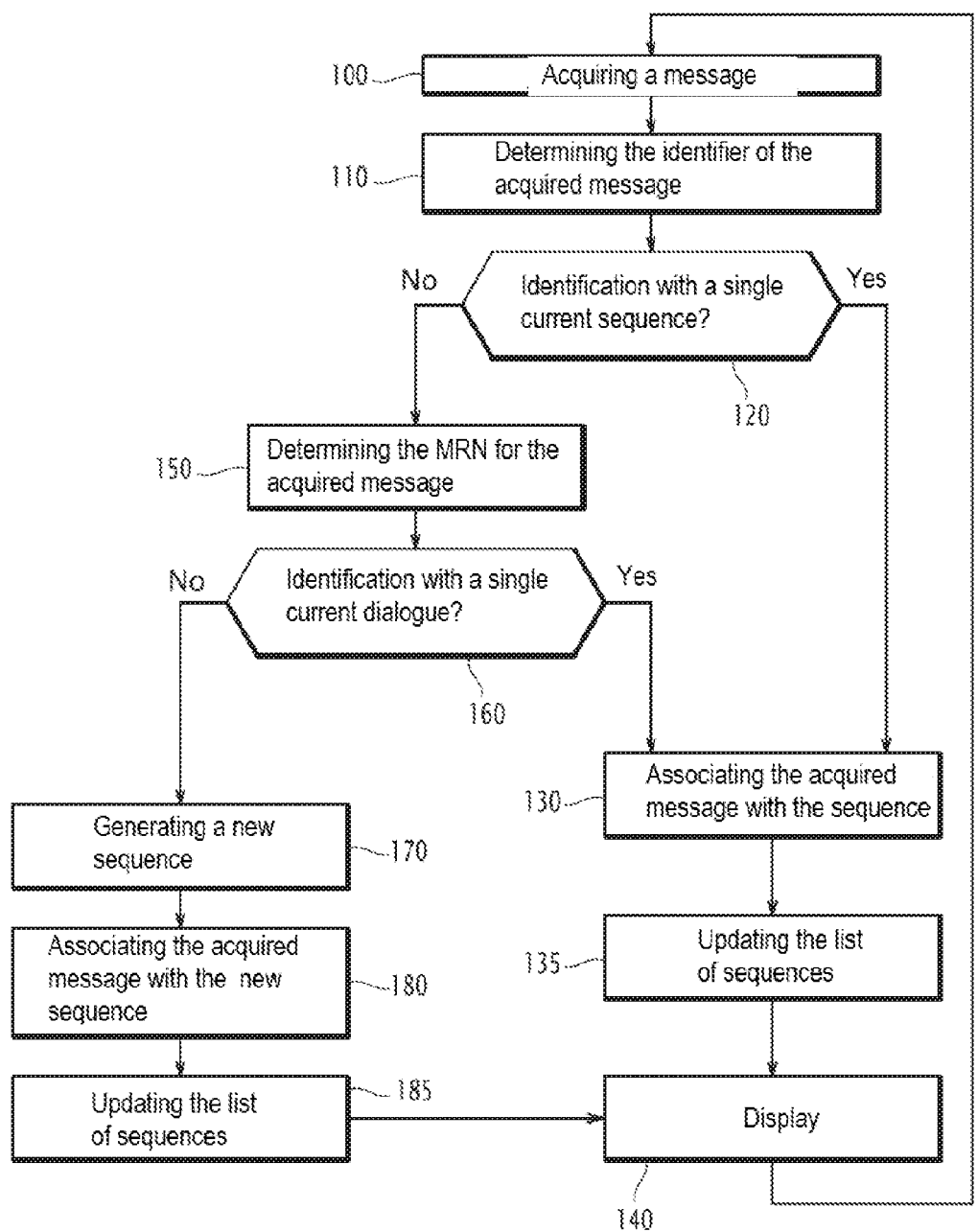
FIG. 2 is a flow chart of a method for managing exchanged messages, implemented by the electronic device of FIG. 1.

The method for managing exchange messages between the aircraft 10 and the ground station 20 will now be described with reference to FIG. 2 illustrating a flow chart of said method.

This management method is implemented by the electronic device 14 at each acquisition of a text message of the <<Data Link>> type by said electronic device 14, in particular by the acquisition module 40.

During the initial step 100, the acquisition module 40 acquires a text message of the <<Data Link>> type and stores it in the storage module 18.

During the next step 110, the determination module 42 extracts the descriptive data DD contained in the acquired message, and then notably determines the identifier of the message, this identifier beginning with <<UM>> or <<DM>>, depending on whether the acquired message is an uplink message received by the aircraft 10 from the ground station 20 or a downlink message intended to be transmitted by the aircraft 10 to the ground station 20.

During the next step 120, the processing module 44 determines whether an association of the acquired message with a current sequence is possible in an exclusive way. In particular, during this step 120, the processing module 44 compares the identifier of the acquired message with the message identifiers contained in the table of current sequences. In other words, the processing module 44 determines whether the acquired message is contained in the current sequence list, and whether this acquired message appears once in said current sequence list.

When the identifier of the acquired message exclusively corresponds to a sequence from among the sequences contained in the table of current sequences, then the processing module 44 passes to step 130 for associating the acquired message with said sequence.

The acquired message is then associated, during step 130, with the exclusively identified sequence, and the table of current sequences, also called current sequence list, is updated, during step 135, in order to take into account the new acquired message, while determining the new expected identifier(s) for said sequence from of the list of sequences, each new expected identifier being the identifier of a next authorized message from said sequence, i.e. of a next possible message of said sequence. Additionally, during this updating step 135, the number MRN of the corresponding dialogue is also updated in the table of sequences, the MRN number being equal to the MIN number of the first message of the dialogue.

In other words, when a single expected identifier is equal to the identifier of the acquired message during step 120, the acquired message is associated during step 130, with the sequence corresponding to this expected identifier, at least one new expected identifier is determined for said sequence from the list of sequences, and the table of current sequences is updated, during step 135, by replacing, for said sequence, the old expected identifier(s) with the new determined expected identifier(s).

Figure 5:
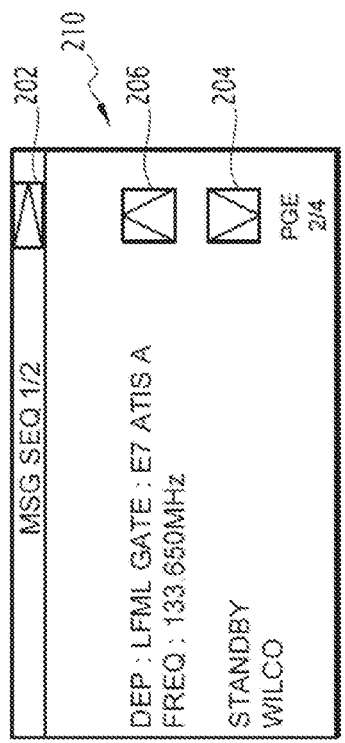
FIGS. 5 to 8 are a view of pieces of information successively displayed during the display of a sequence.
Figure 6:
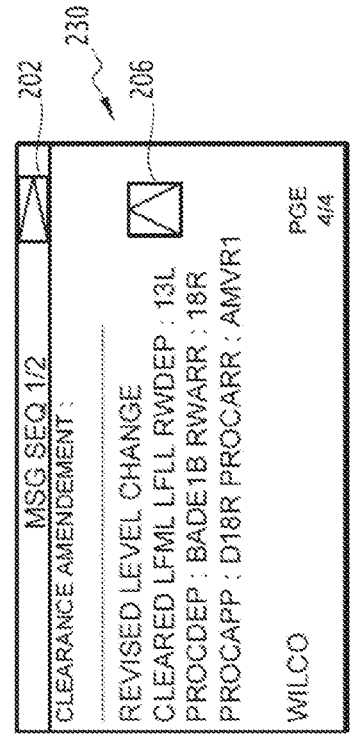
Figure 7:
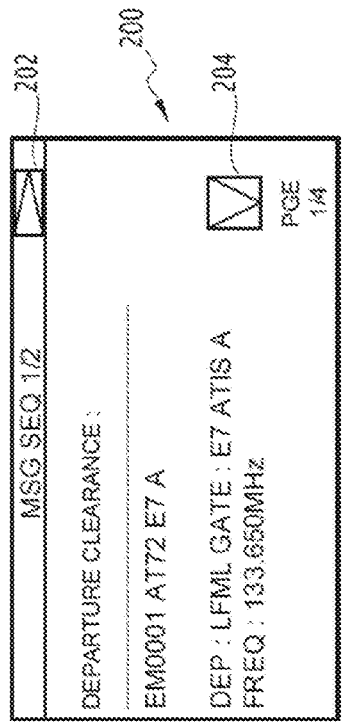
Figure 8:
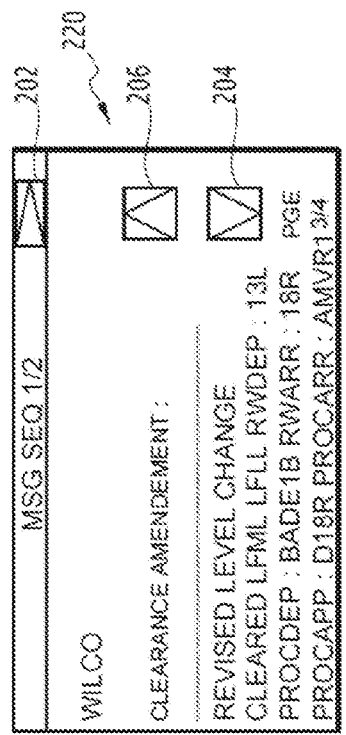

The method then passes to step 140 during which the display module 46 gives the possibility of displaying the grouped dialogue(s), according to the invention, as sequences, with displayed exemplary views visible in FIGS. 5 to 8. In FIG. 5, a first view 200 corresponds to the beginning of a sequence numbered 1 out of 2, with further the display of a first icon 202 as an arrow towards the right, the selection of which gives the possibility of passing to a next sequence, for example here to the sequence numbered 2 out of 2, and also the display of a second icon 204 as a downward arrow, the selection of which gives the possibility of passing to the continuation of the sequence, for example display a next message. Further, a third icon 206 as an upward arrow, visible in FIGS. 6 to 8 gives the possibility, when it is selected, to return back in the sequence.

In FIG. 6, a second view 210 corresponds to the display of the sequence following the selection of the second icon 204, with always the display of the first and second icons 202, 204, and further the display of the third icon 206, the selection of which gives the possibility of returning back in the sequence, for example displaying a previous message. From the second view 210, the selection of the second icon 204 causes the display of a third view 220, visible in FIG. 7, and a new selection of the second icon 204 causes the display of a fourth view 230, visible in FIG. 8, corresponding here to the end of the sequence.

A page counter displayed on the lower right of each view further gives the possibility to the pilot of finding his way within a given sequence gradually during the successive display of the different messages forming said sequence.

At the end of the display step 140, the method returns to step 100 during which the acquisition module 40 will acquire a new message.

During step 120, if the processing module 44 cannot determine an exclusive association of the acquired message with a current sequence, then the processing module 44 passes the step 150. Passing to step 150 then corresponds to the case when such a sequence does not exist or else to the case when the possible association is not unique.

During step 150, the processing module 44 then determines the dialogue number of the acquired message, such as the MRN number, and then compares, during step 160, the determined dialogue number with the dialogue numbers contained in the table of current sequences.

When the determined dialogue number is identical with a dialogue number contained in the table of current sequences, this identity is necessarily unique, the dialogue number forming a unique identifier of each dialogue, and the processing module 44 then passes the step 130 for associating the acquired message with the sequence corresponding to the dialogue number of the acquired message, from among the sequences for which the expected identifiers are equal to the identifier of the acquired message.

When, during step 160, the determined dialogue number does not correspond to a dialogue number contained in the table of current sequences, then this corresponds to the case when during step 120 no expected identifier was equal to the identifier of the acquired message, and the processing module 44 then passes through the step 170 for generating a new sequence.

Thus, a new sequence is generated, during step 170, when no expected identifier is equal to the identifier of the acquired message, the acquired message is associated, during step 180, with the new generated sequence. And then, at least one expected identifier is, during step 185, determined for the new sequence from the list of sequences, and the table of current sequences is updated by adding said new sequence with the determined expected identifier(s). Additionally, during this updating step 185, the number MRN of the corresponding dialogue is updated in the table of current sequences, the number MRN being equal to the MIN number of the first message of the dialogue, in this case here to the MIN number of the acquired message.

During step 170, a new sequence is generated only if the identifier of the acquired message corresponds to the entry point of a sequence from the list of sequences.

At the end of step 185, the method passes to the display step 140 described earlier, and then returns to the initial step 100 for acquiring a new message via the acquisition module 40.

Thus, the fact of grouping the dialogues as sequences, notably for displaying the messages of the <<Datalink>> type acquired as sequences, gives the possibility to the pilot to very rapidly establish a link between the acquired message and the previously acquired messages of a current sequence or else of immediately noticing that this is a new sequence.

The pilot notably no longer needs to search for the previous message of a current sequence in the history of the acquired messages, in order to produce the link with a new acquired message, the grouping of the messages as sequences being accomplished automatically by the electronic management device 14.

For example in the case of a clearance, when the pilot receives the revision several minutes after having sent the response to the ground clearance, he/she immediately remembers the context of the sequence, without any mental reconstruction effort, just by covering the display of said sequence.

The management method and the electronic management device 14 according to the invention then allow the pilot to more rapidly interpret a new acquired message and to react more quickly. The management method and the electronic management device 14 according to the invention then generate greater flight security of the aircraft 10.

It is then conceivable that the management method and device 14 according to the invention allow reducing the cognitive burden required from the pilot and improving the flight safety of the aircraft 10.

The invention claimed is:

1. A method for managing messages exchanged between a ground station and an aircraft piloted by at least one pilot, each message including an identifier, a dialogue number and data, the method being implemented by an electronic device for managing exchanged messages, and comprising:
   acquiring a message;
   determining the identifier of the acquired message;
   comparing the identifier of the acquired message with message identifiers contained in a table of current sequences, and
   when the identifier of the acquired message corresponds to a sequence from among the sequences contained in the table of current sequences,
      associating the acquired message with said sequence, and
   when the identifier of the acquired message does not correspond to any of the sequences contained in the table of current sequences:
      generating a new sequence using a list of sequences,
      associating the acquired message with the new generated sequence, and
      updating the table of current sequences with the new generated sequence;
   each sequence including one or several dialogues, each dialogue including at least two messages, said messages corresponding to a request and to a response to this request respectively.

2. The method according to claim 1, wherein the method further comprises displaying at least one current sequence, each displayed sequence including the acquired message(s) associated with said sequence.

3. The method according to claim 1, wherein the list of sequences includes an entry point for each sequence, the entry point being the identifier of the first message of the sequence, and
   wherein a new sequence is generated only if the identifier of the acquired message corresponds to the entry point of a sequence from the list of sequences.

4. The method according to claim 1, wherein the table of current sequences contains, for each sequence, at least one expected identifier, each expected identifier being the identifier of a next authorized message of the sequence, and wherein the list of sequences includes, for each sequence, one or several possible series of authorized messages.

5. The method according to claim 4, wherein the list of sequences includes an entry point for each sequence, the entry point being the identifier of the first message of the sequence, and wherein a new sequence is generated only if the identifier of the acquired message corresponds to the entry point of a sequence from the list of sequences; and wherein a new sequence is generated when no expected identifier is equal to the identifier of the acquired message, at least one expected identifier then being determined for the new sequence from the list of sequences, and the table of current sequences being updated by adding said new sequence with the determined expected identifier(s).

6. The method according to claim 4, wherein when a single expected identifier is equal to the identifier of the acquired message, the acquired message is associated with the sequence corresponding to this expected identifier, at least one new expected identifier is determined for said sequence from the list of sequences, and the table of current sequences is updated by replacing, for each sequence, the old expected identifier(s) with the new determined expected identifier(s).

7. The method according to claim 4, wherein the method further comprises, when several expected identifiers are equal to the identifier of the acquired message, determining the dialogue number of the acquired message, and the acquired message is associated with the sequence corresponding to the dialogue number of the acquired message, from among the sequences for which the expected identifiers are equal to the identifier of the acquired message.

8. The method according to claim 7, wherein the determined dialogue number is an MRN number according to the RTCA DO258A standard.

9. The method according to claim 1, wherein each message is a data link message according to layer 2 of the ISO model according to the ISO 7498 standard.

10. A non-transitory computer-readable medium including a computer program product including software instructions which when executed by a computer, implement the method according to claim 1.

* * * * *